United States Patent [19]
Jimenez

[11] 3,770,313
[45] Nov. 6, 1973

[54] AUTOMOTIVE AUXILIARY WINDSHIELD

[76] Inventor: Narciso H. Jimenez, 508 51st St., West New York, N.J. 07093

[22] Filed: June 2, 1970

[21] Appl. No.: 42,744

[52] U.S. Cl. .................... 296/95 C, 49/118, 49/349
[51] Int. Cl. ............................................... B60j 1/20
[58] Field of Search ............ 296/84 R, 84 C, 84 M, 296/91, 95 R, 95 C; 49/116, 118, 120, 122, 349, 350, 351; 180/114

[56] References Cited
UNITED STATES PATENTS

| | | | |
|---|---|---|---|
| 3,574,392 | 4/1971 | Hirano | 296/91 |
| 1,773,040 | 8/1930 | Harden | 296/84 M |
| 2,082,349 | 6/1937 | Magidson | 296/84 R |
| 3,026,140 | 3/1962 | Schutte | 296/84 R |
| 1,731,439 | 10/1929 | Riehl | 296/84 R |

FOREIGN PATENTS OR APPLICATIONS 1,044,031  6/1953  France ............................... 49/349

*Primary Examiner*—Leo Friaglia
*Assistant Examiner*—Leslie J. Paperner
*Attorney*—J. Gibson Semmes

[57] ABSTRACT

This is an extendible-retractable auxiliary windshield for automobiles to protect the vehicle against misappropriation by blanking the necessary means for viewing outside the automobile, while simultaneously protecting the windshield during non-use of the vehicle against inclement weather and the like.

5 Claims, 5 Drawing Figures

INVENTOR
NARCISCO HERBERTO JIMENEZ
BY John Gibson Semmes
ATTORNEY

AUTOMOTIVE AUXILIARY WINDSHIELD

SUMMARY OF THE INVENTION

An automobile auxiliary windshield which is extendible and retractable into the hood of the vehicle during selected periods of non-use thereof, the same being adapted to locking in position of weatherproof extension in adjacent contact with the extant windshield during non-use of the vehicle and retractable into the hood of the vehicle when the vehicle is being used.

DESCRIPTION OF THE PREFERRED EMBODIMENTS

Figure 1:
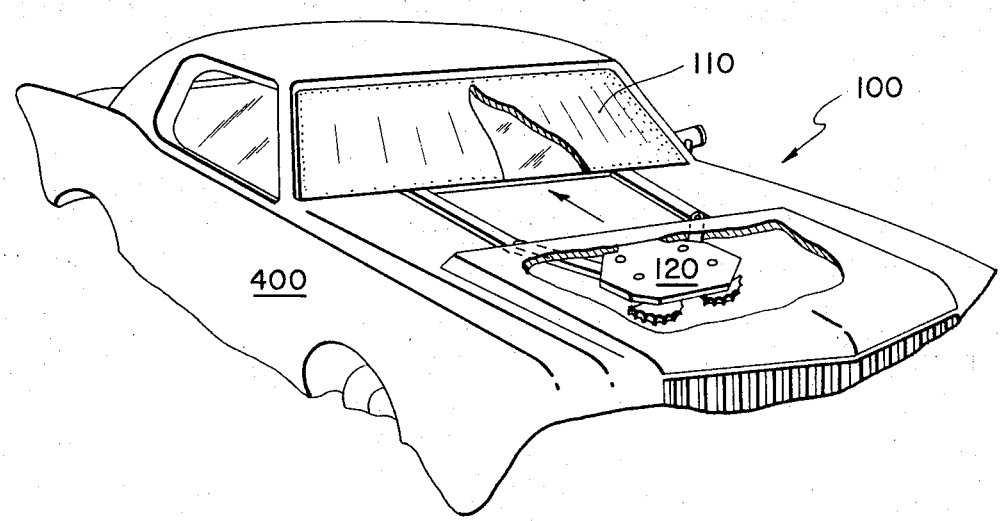
FIG. 1 is a view in perspective of vehicle showing the preferred embodiment of invention in utility position, the same being an isometric view.

With reference to FIG. 1, the conventional vehicle being 300 equipped with an engine hood having a cowling therein, the rearward end of which is open to the windshield, there is shown the automatic extendible-retractable auxiliary windshield system 100, comprising the auxiliary windshield 110, hinged respectively at 112 and 112' in connection with the frame 114. Said frame comprises longitudinally extending slides 118, the same having articulate connection with cranks 118', these latter elements being most clearly shown in FIGS. 2 and 3. The windshield 110 may be fabricated of any suitable non-abrasive substance which is either transparent or translucent or of blank color, depending upon the requirements of the owner. By way of example, if of a blank color, the windshield may be used as a security, as well as a weather protective element for the extant windshield as will be apparent hereinafter.

Referring again to FIGS. 2 and 3, the cranks 118' are motivated upon either manual or automatic power means through the extension-retraction system 120, which includes the reciprocable element 124 which has gear connection with the cams 126 to effect extension and retraction of the articulately connected frame 114 and auxiliary windshield 110. As will be apparent, the extension retraction system 120 is fitted permanently to the interior of the cowling of the hood and may include an automatically actuable motor system, controlled from the ignition or auxiliary electric system of the vehicle. The respective auxiliary windshield 110 and supporting frame 114 are adapted to securing in corresponding raceways formed interiorly of the hood and shown generally in phantom as at 140.

A suitable storage locking means 142 is seated within the frame elements 118, said locking means being adapted to plunger - recess engagement (not shown) with the hood of the car; and this to be either automatically or manually operable. A typical magnetically operative plunger adapted to hood recess is within the concept, operated upon ignition accessory switch closing. Similar extension lock 116 may be used during extension of the auxiliary windshield.

Figure 4:
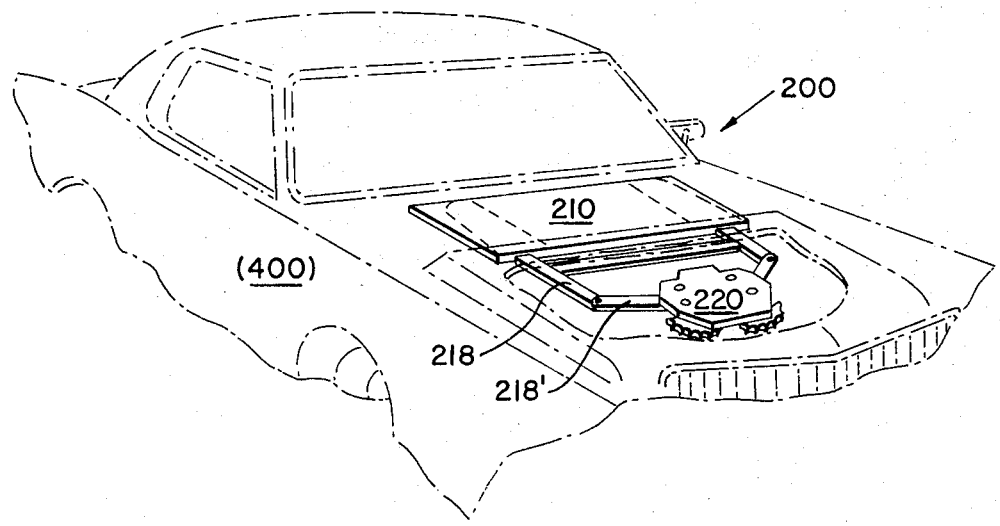
FIG. 4 is an isometric view of modification of invention, according to the basic principles of the FIG. 1 concept;and, FIG. 5 is a top plan view of the invention of FIG. 4 in storage position.
Figure 2:
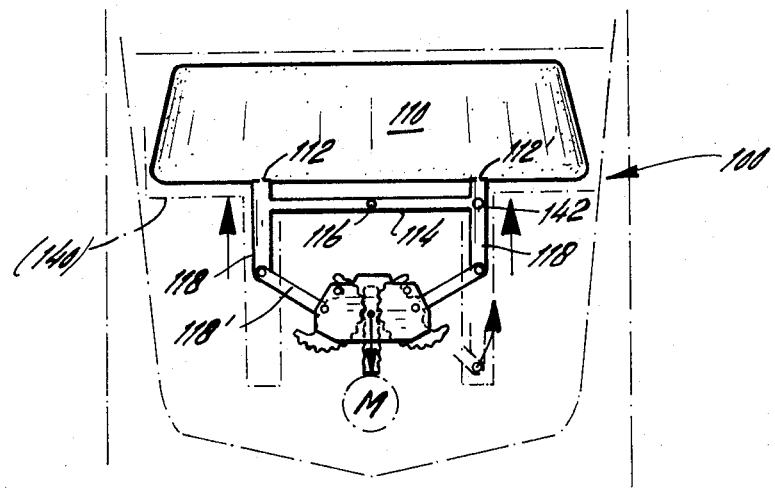
FIG. 2 is a top plan view of invention, showing storage position, relative to the hood of the vehicle.
Figure 3:
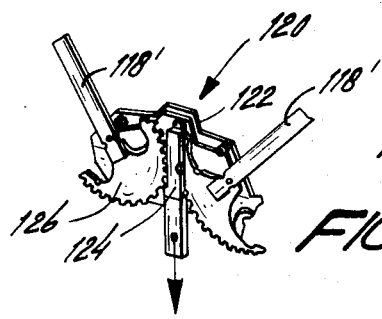
FIG. 3 is a view enlarged isometric fragmental view, showing the means for extension and retraction of the windshield secured to its utility position.
Figure 5:
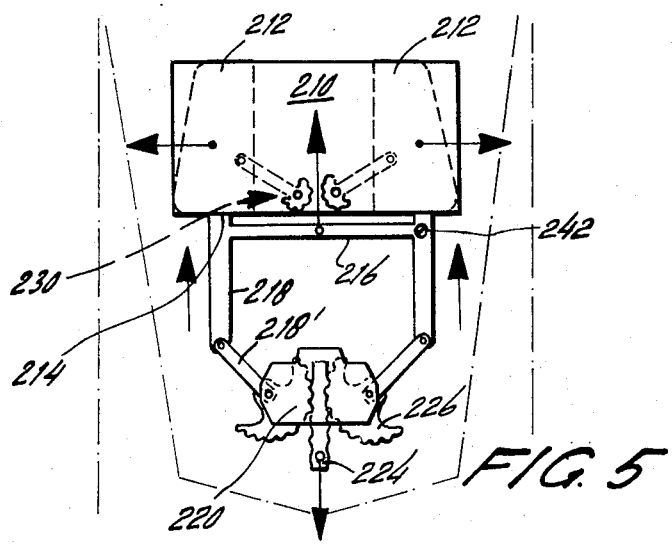

With reference to FIG. 4, a modified system 200 is shown in which the windshield 210 (FIG. 5) in its auxiliary counterpart includes extendible and retractable wings 212, this particular adaptation being better suited to vehicles in which the cowling of the hood of the vehicle 400 is dimensionally smaller than that shown in the vehicle 300, reference FIGS. 1 and 2. Motivation for this unit is substantially the same as for the other excepting that to extend and retract the wings 212. There is an auxiliary crank 230 which may be manually or automatically actuable after extension of the auxiliary windshield into its upright position, substantially adjacent the extant windshield of the vehicle 400. Otherwise, the construction hereof is basically the same as shown in the FIG. 1 - 2 device. For example, the auxiliary windshield 210 comprising wings 212, extendible and retractable by auxiliary crank system 230 is hingedly attached to the frame 216 as at 214 the longitudinally extending frame members 218 having articulate contact with the cranks 218' for actuation by the rack and pinion system 220, shown to include the rack 224 and pinions 226, the entire being secured to the interior of the hood of the vehicle 400.

A similar locking system 242 (reference 142) is shown.

I claim:

1. Retractable vehicular auxiliary windshield, comprising in combination with a vehicle having extant windshield and hood in association therewith comprising:
    A. moveable auxiliary windshield, mounted within the hood;
    B. means in the hood to mount the windshield adjacent the underside of the top thereof;
    C. auxiliary windshield actuating means mounted in the hood to extend and retract the windshield upon actuation thereof;
    D. a frame connecting the auxiliary windshield in articulate relation to the actuating means.

2. The auxiliary windshield according to claim 1 in which the auxiliary windshield is co-extensive with respect to the extant windshield upon extension thereof in contact therewith.

3. The auxiliary windshield of claim 2 in which the frame mounts an actuable lock, coactive with the hood of the vehicle.

4. Auxiliary windshield according to claim 2 in which said auxiliary windshield comprises laterally extensible segments, actuable upon extension of the auxiliary windshield into contact with the extant windshield and means associated with said respective segments for actuation and de-actuation thereof into lateral co-extension with said extant windshield.

5. The auxiliary windshield of claim 4 in which the frame mounts an actuable lock, coactive with the hood of the vehicle.

* * * * *